(12) United States Patent
Lofts

(10) Patent No.: US 10,500,506 B2
(45) Date of Patent: Dec. 10, 2019

(54) SUBMARINE AMUSEMENT RIDE

(71) Applicant: Underwater Mobile Observatories International Pty Ltd, Southport, Queensland (AU)

(72) Inventor: Peter Anthony Lofts, Southport (AU)

(73) Assignee: Underwater Mobile Observatories International Pty. Ltd., Queensland (AU)

( * ) Notice: Subject to any disclaimer, the term of this patent is extended or adjusted under 35 U.S.C. 154(b) by 374 days.

(21) Appl. No.: 15/435,488

(22) Filed: Feb. 17, 2017

(65) Prior Publication Data

US 2017/0239581 A1 Aug. 24, 2017

(30) Foreign Application Priority Data

Feb. 18, 2016 (AU) ................................ 2016900575

(51) Int. Cl.
| | | |
|---|---|---|
| A63G 3/06 | (2006.01) | |
| A63G 31/00 | (2006.01) | |
| B60F 3/00 | (2006.01) | |
| B61B 13/00 | (2006.01) | |
| B61D 15/00 | (2006.01) | |
| A63G 31/16 | (2006.01) | |
| B61B 13/04 | (2006.01) | |

(52) U.S. Cl.
CPC ............. *A63G 3/06* (2013.01); *A63G 31/007* (2013.01); *A63G 31/16* (2013.01); *B60F 3/0061* (2013.01); *B61B 13/00* (2013.01); *B61D 15/00* (2013.01); *B61B 13/04* (2013.01)

(58) Field of Classification Search
CPC ........ A63G 3/06; A63G 31/007; A63G 31/16; B60F 3/0061; B61D 15/00; B61B 13/00
USPC .......................................................... 104/71
See application file for complete search history.

(56) References Cited

U.S. PATENT DOCUMENTS

| | | | | |
|---|---|---|---|---|
| 138,405 | A * | 4/1873 | Janney ..................... | B61G 3/04 |
| | | | | 213/141 |
| 728,062 | A * | 5/1903 | Wilson ..................... | A63G 3/06 |
| | | | | 104/71 |
| 743,968 | A * | 11/1903 | Wilson ..................... | A63G 3/06 |
| | | | | 104/207 |
| 761,785 | A * | 6/1904 | Pfeiffer .................... | B61D 1/04 |
| | | | | 105/344 |
| 764,675 | A * | 7/1904 | Pfeiffer .................... | A63G 3/06 |
| | | | | 104/71 |

(Continued)

*Primary Examiner* — Zachary L Kuhfuss
(74) *Attorney, Agent, or Firm* — Boyle Fredrickson S.C.

(57) ABSTRACT

An underwater mobile observatory system comprising an aquarium able to hold water and large enough to support fish, coral, and to display artificial objects such as shipwrecks and ruins, a vehicle track extending through the aquarium the track generally being adjacent the bottom of the aquarium, the track having a portion which rises to a loading/unloading position, and a passenger vehicle coupled to the track for movement therealong and unable to leave the track such that changes in inclination of the track causes the vehicle to move up and down through water in the aquarium, the passenger vehicle having a main body portion to seat passengers and which is capable of being submerged, and a top portion which is open to the air, the spacing between the track and the water level being controlled such that water does not pass over the top portion.

3 Claims, 5 Drawing Sheets

(56) References Cited

U.S. PATENT DOCUMENTS

| | | | | | |
|---|---|---|---|---|---|
| 883,441 | A | * | 3/1908 | Andrews | A63G 3/06 |
| | | | | | 104/139 |
| 931,863 | A | * | 8/1909 | Haight | A63G 3/06 |
| | | | | | 104/172.3 |
| 1,606,024 | A | * | 11/1926 | Gorhum | A63G 3/00 |
| | | | | | 104/71 |
| 1,849,226 | A | * | 3/1932 | Erban | A63G 3/06 |
| | | | | | 104/71 |
| 2,064,035 | A | * | 12/1936 | Rynearson | A63G 3/06 |
| | | | | | 104/71 |
| 3,114,333 | A | * | 12/1963 | Fowler | A63G 31/16 |
| | | | | | 104/71 |
| 3,269,349 | A | * | 8/1966 | Gehlen | B60F 3/0061 |
| | | | | | 14/2.6 |
| 4,904,118 | A | * | 2/1990 | Thiemann, III | B63B 35/44 |
| | | | | | 405/195.1 |
| 5,215,016 | A | * | 6/1993 | Futami | A63G 3/06 |
| | | | | | 104/247 |
| 5,775,226 | A | * | 7/1998 | Futami | B63G 8/001 |
| | | | | | 104/139 |
| 5,778,796 | A | * | 7/1998 | Kim | B60L 13/10 |
| | | | | | 104/130.07 |
| 6,058,848 | A | * | 5/2000 | Futami | A63G 3/06 |
| | | | | | 104/71 |
| 6,066,049 | A | * | 5/2000 | Milanian | A63G 3/06 |
| | | | | | 472/128 |
| 6,145,442 | A | * | 11/2000 | Lofts | A63G 3/06 |
| | | | | | 104/59 |
| 2014/0162025 | A1 | * | 6/2014 | Stuber | B29C 51/082 |
| | | | | | 428/156 |
| 2017/0239581 | A1 | * | 8/2017 | Lofts | A63G 31/007 |

* cited by examiner

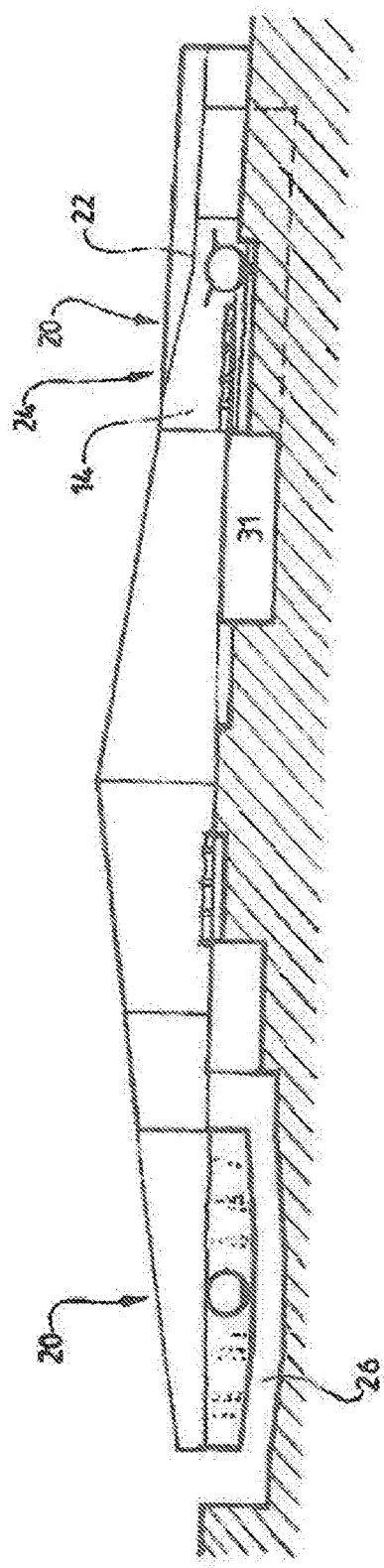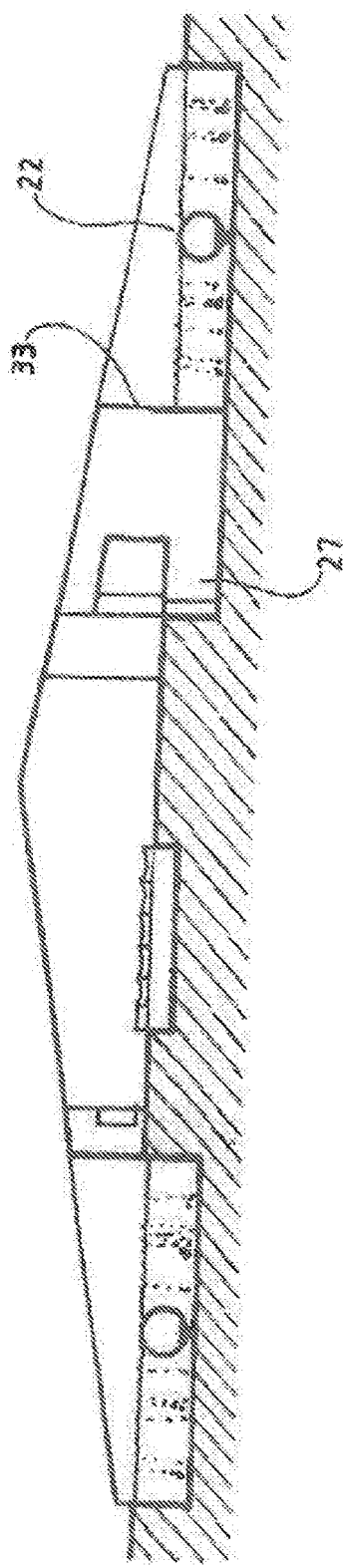
Figure 3
Figure 4

SUBMARINE AMUSEMENT RIDE

CROSS-REFERENCE TO RELATED APPLICATION

This application claims the benefit of priority under 35 U.S.C. § 119 to Australian Patent Application No. 2016900575, filed Feb. 18, 2016, the disclosure of which is incorporated herein by reference in its entirety.

FIELD OF THE INVENTION

This invention relates to an aquarium/oceanarium containing underwater mobile observatory vehicles, and which functions to provide education and entertainment to patrons.

BACKGROUND OF THE INVENTION

Studies have shown that underwater adventures are popular and attractive to members of the public, and some theme parks and amusements parks have some form of underwater or aquatic observatory system in place.

A well-known system has a clear plastic tunnel passing through a large aquarium or oceanarium which is filled with coral and marine life. The tunnel has a moving walkway and patrons stand on the walkway and are transported through the aquarium.

Another popular known system also has a large aquarium or oceanarium and a semi-submersible vehicle is powered through the oceanarium with a low powered motor.

The semi-submersible vehicle is powered through a propeller and requires stringent safety controls and highly trained operators to use the semi-submersible vehicle in a safe manner. The vehicles are difficult and clumsy to manoeuvre and loading and unloading of passengers is a slow process as the vehicle needs to be carefully powered into a mooring position, then needs to be moored (which can be time consuming), and passengers then need to embark and disembark in a manner to keep the correct buoyancy level of the vehicle. These semi-submersible vehicles suffer from a number of disadvantages including a low limit of passengers (usually about 20-25), singular viewing windows and ports required because of the high hull strength required.

It will be clearly understood that, if a prior art publication is referred to herein, this reference does not constitute an admission that the publication forms part of the common general knowledge in the art in Australia or in any other country.

SUMMARY OF INVENTION

The present invention is directed to a submarine amusement ride, which may at least partially overcome at least one of the abovementioned disadvantages or provide the consumer with a useful or commercial choice.

With the foregoing in view, the present invention in one form, resides broadly in an underwater mobile observatory system comprising an aquarium able to hold water and large enough to support fish, coral, and to display artificial objects such as shipwrecks and ruins, a vehicle track extending through the aquarium the track generally being adjacent the bottom of the aquarium, the track having a portion which rises to a loading/unloading position, and a passenger vehicle coupled to the track for movement therealong and unable to leave the track such that changes in inclination of the track causes the vehicle to move up and down through water in the aquarium, the passenger vehicle having a main body portion to seat passengers and which is capable of being submerged, and a top portion which is open to the air, the spacing between the track and the water level being controlled such that water does not pass over the top portion.

The terms aquarium/oceanarium can be used interchangeably with both terms including a large body of water in which the track can be laid and through which the vehicle can pass.

In another form, the invention resides in a vehicle as described above.

By having the vehicle coupled to the track and by allowing the track to rise and fall relative to the water level, the vehicle by moving along the track, can quickly go to a loading and unloading position and then semisubmerge back into the oceanarium to a viewing position.

It is preferred that the bulk of the vehicle is below the water level and especially the main body portion. An upper portion or top wall of the vehicle can be positioned just above the water, and this portion can be fitted with emergency or escape hatches. By designing the track, and the vehicle, and by controlling the water level, it is possible to ensure that the very top of the vehicle is just above the water line such that the passengers have the sensation that they are entirely underwater, yet the vehicle is safe in that should there be a problem, the emergency or escape hatches can be opened and the passengers can quickly exit.

It is preferred that the aquarium has a walkway or escape way above the level of the water and immediately above the vehicle such that should an emergency situation arise, the escape hatches can be opened and passengers can simply move on to the walkway and away from the vehicle.

The walkway can be supported above the aquarium by any convenient method including support cables, struts and the like.

The vehicle is powered along the track and the rate of movement can be controlled manually or by computer.

One propulsion method can include a cable system to tow the cables along the track. Another arrangement may include electric motors to push the vehicle along the track. Other drive mechanisms are also envisaged.

The track itself can be formed from concrete, metal or other material which does not appreciably corrode in the aquarium or oceanarium environment. It is preferred that the track is substantially T-shaped when viewed in section as this allows the vehicle to be coupled to the track. The track is preferably supported slightly above the oceanarium floor (typically between 0.5 m-2 m) to prevent the track being fouled by sand, grit, seaweed and the like.

The vehicle itself has some form of track coupling means on the bottom of the vehicle and the track coupling means may comprise one or more rollers which roll over the track. It is preferred that rollers extend above and below the T-shaped track to couple the vehicle to the track.

The track passes through the aquarium and the main portion of the track is suitably on or around the bottom of the aquarium. At the loading and unloading portion, the track can rise above the bottom of the aquarium, or alternatively the bottom of the aquarium may rise with the track following the rise. In both instances, the result is that the vehicle rises substantially above the water level such that passengers can easily move in and out of the vehicle.

The vehicle itself can be designed to hold a fairly large number of people (more than 25), and as the vehicle is coupled to the track, its design considerations can be such that the main passenger portion can have large continuous viewing windows rather than individual ports.

It is preferred that the aquarium is annular in shape with a circular track extending through the aquarium.

The aquarium can be of any size and typically the track has a length of between 100 m-500 m and preferably about 220 m, and the track diameter can be for instance 80 m.

The aquarium can be divided into different themed displays, for instance an Atlantis display, a graveyard of shipwrecks display, and a futuristic city under the sea display, with the vehicle passing through the displays.

It is to be understood that the vehicle can be powered by various power sources and potentially may utilise a secondary internal back-up power source/drive system. This back-up power source for the vehicles, if utilised, would have sufficient reserve power to allow one vehicle to push and/or pull any one or more other vehicles in a vehicle string to the loading/unloading dock. Each vehicle could have an automatic pressure-activated coupling system to allow hands free connection for the vehicles, if this contingency is required.

Various styles of passenger seating are available for the vehicles, including a system of seating designed to fold away onto itself away from a centre aisle, to be easily and functionally secured against the lower bulkheads on either lateral side of the interior of the vehicle. This system of fold-away seating (amongst other options) would then protrude onto the internal floor space of the vehicle a maximum of approximately 90 cm on either side. This practical removal of all passenger seating from the centre of the vehicle, would give maintenance staff easy access to centre line removable floor panels to examine and service any secondary power source below that floor space.

The annular aquarium may house, in various depths of water, a number of attractions that could identify with some of the mysteries of the sea, surrounded by an abundance of natural marine life. One of the many underwater attractions could be a representation of a futuristic city thriving under the sea. This city could be composed of elliptical domed structures inter-connected by transparent acrylic walkways. The walkways and domes could be both ventilated and pressurised with easy access from the central hub of the theme park, as an alternative viewing platform for the aquarium patrons.

Many variations exist giving seated passengers in the vehicles an excellent arc of visibility of all the aquarium marine life and attractions through full length viewing screens. Due to the height of the vehicle, it is possible that a passenger could, at some locations on the amusement ride, have an external view that of the waterline which would detract from the reality of the ride because the illusion of depth would be lost for that passenger. In order to avoid this, it is preferred that the arc of visibility from the full length viewing screens be wide when a passenger is looking outwardly (laterally and downwardly), but restricted when a passenger looks out and upward. Preferably, an enlarged "brow" or similar may be provided adjacent external topside of the preferred full length convex viewing screens of the vehicles. In a preferred form, the brow may be or include an approximately 30 cm outward protrusion on each side of the vehicle above each of the full length convex viewing screens (or a single outward protrusion on each side of the vehicle above the full length convex viewing screens to intentionally restrict or constrain the upward viewing angle of seated passengers, thereby maintaining the illusion of depth.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIGS. 3 and 4 are side section views taken along A-A (FIG. 3) and B-B (FIG. 4).

DETAILED DESCRIPTION OF THE INVENTION

According to a particularly preferred embodiment of the present invention, an underwater mobile observatory amusement ride is provided.

Figure 1:
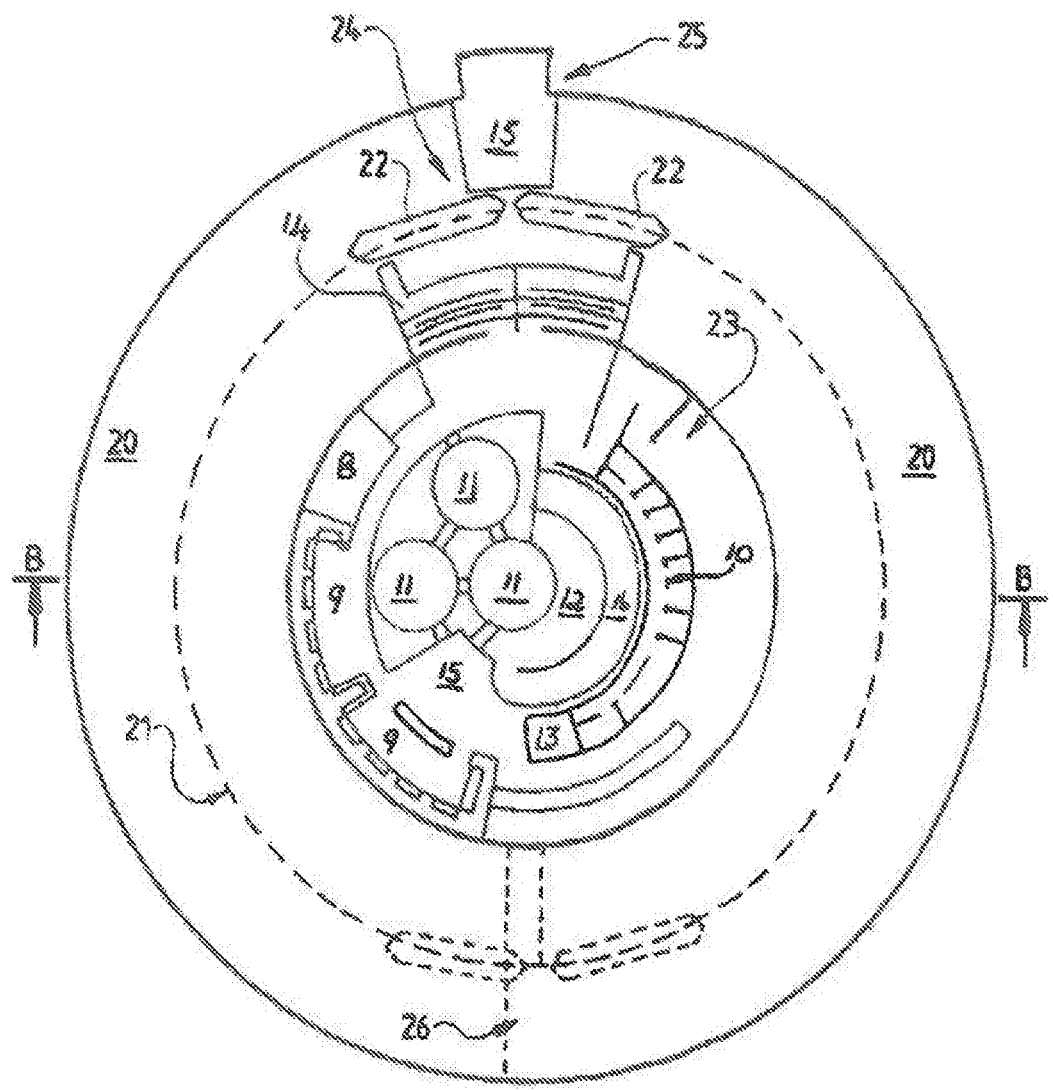
FIGS. 1 and 2 are plan part section views of an underwater mobile observatory system taken along sections A-A and B-B.
Figure 2:
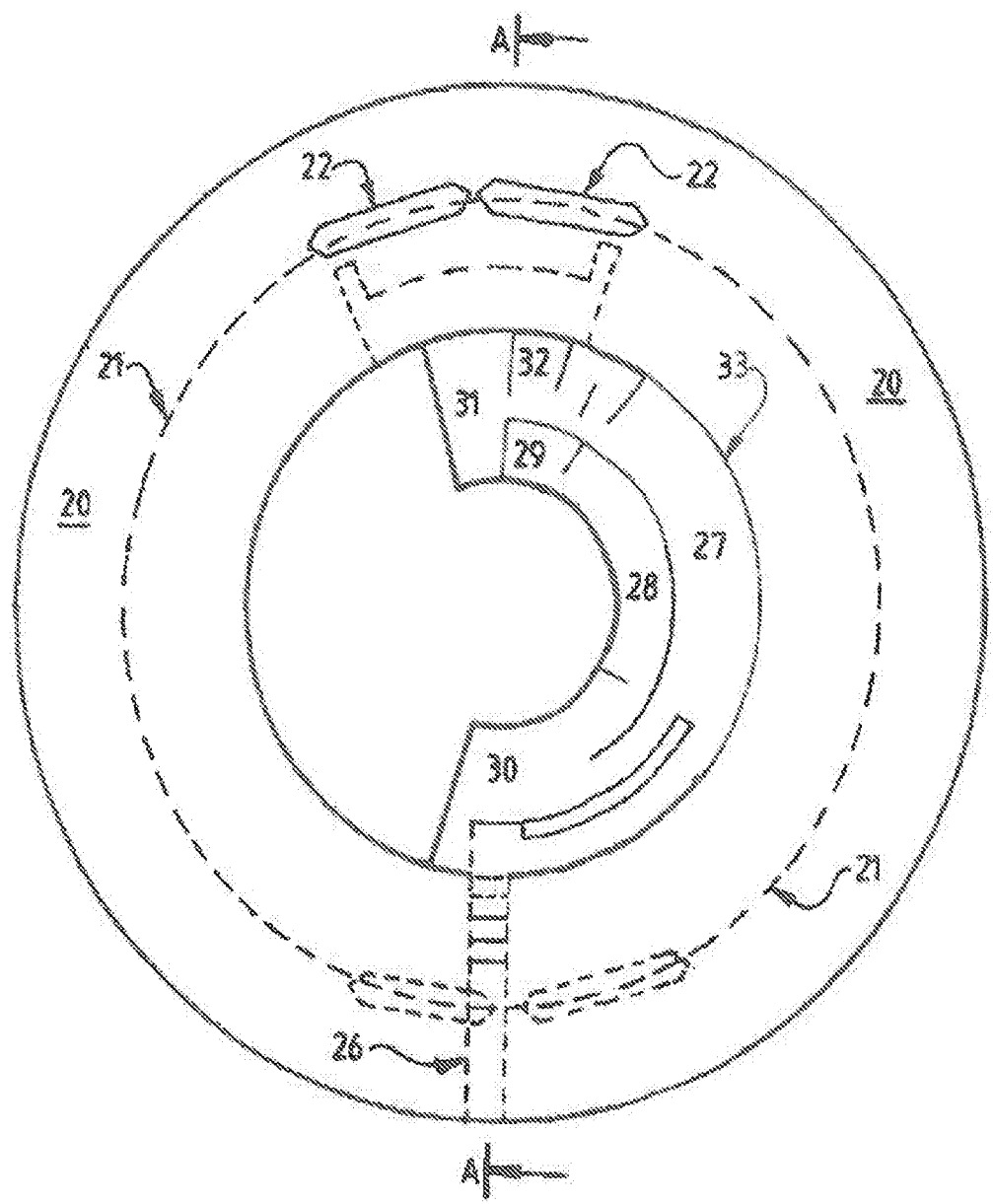

Referring to the drawings and initially to FIGS. 1 and 2, there is shown an underwater mobile observatory complex. The complex has an annular shaped aquarium 20. Inside aquarium 20 is an annular track 21, the diameter of the track being about 80 m and the length of the track being about 220 m (it being appreciated that this is only one of many different possible diameters and lengths).

Coupled to track 21 are a pair of vehicles 22, the vehicle being linked together to allow more passengers per hour through the aquarium. Of course, it should be appreciated that the vehicle need not be linked together or that more than two vehicles can be provided.

The central hub area 23 includes infrastructure, lounge, dining rooms, and various other themed accessories for visitors. For instance, referring to FIG. 1, the central hub area 23 includes audio-visual theatre and static marine display 8, marine life display tanks 9, staff and administration center 10, floating pontoon waiting lounges. 11, concession area and servery 12, toilets 13, a queuing platform 14 to embark vehicles 22, a shop 15 and a themed tropical rainforest and aviary 16.

Track 21 is formed from marine concrete or other similar material which is corrosion resistant in an aquatic environment, and is T-shaped when viewed in section which is more clearly illustrated with reference to FIG. 6.

Figure 6:
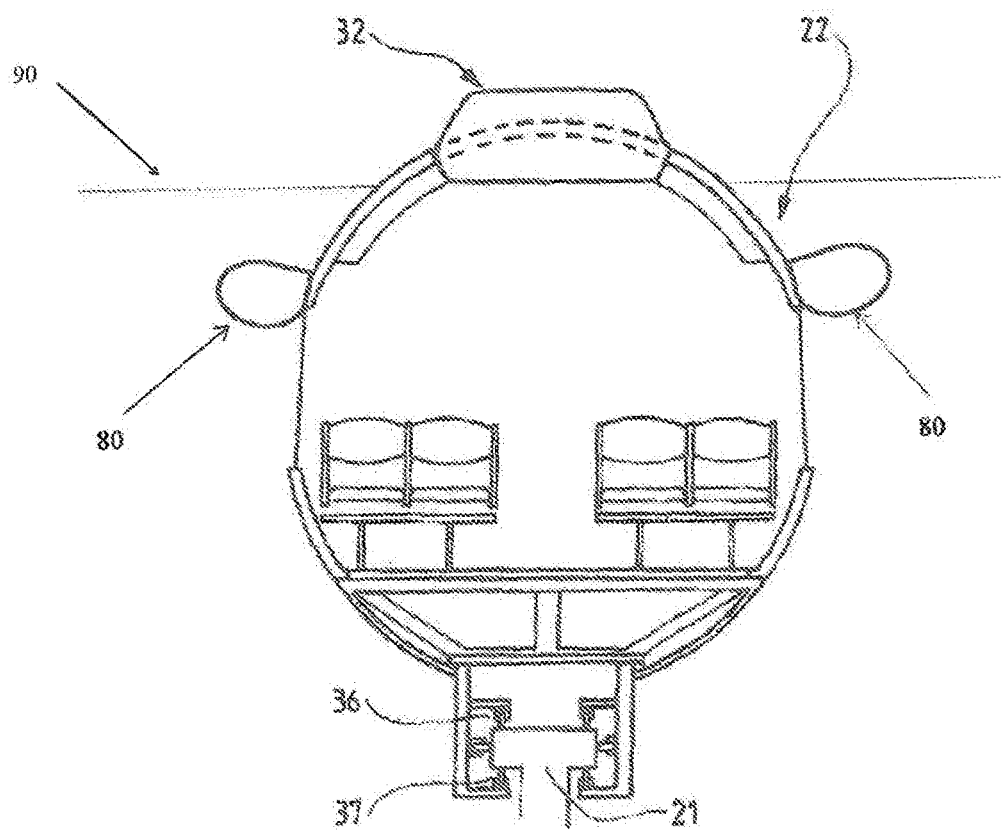
FIG. 6 is a transverse section view of the vehicle of FIG. 5.
Figure 7:
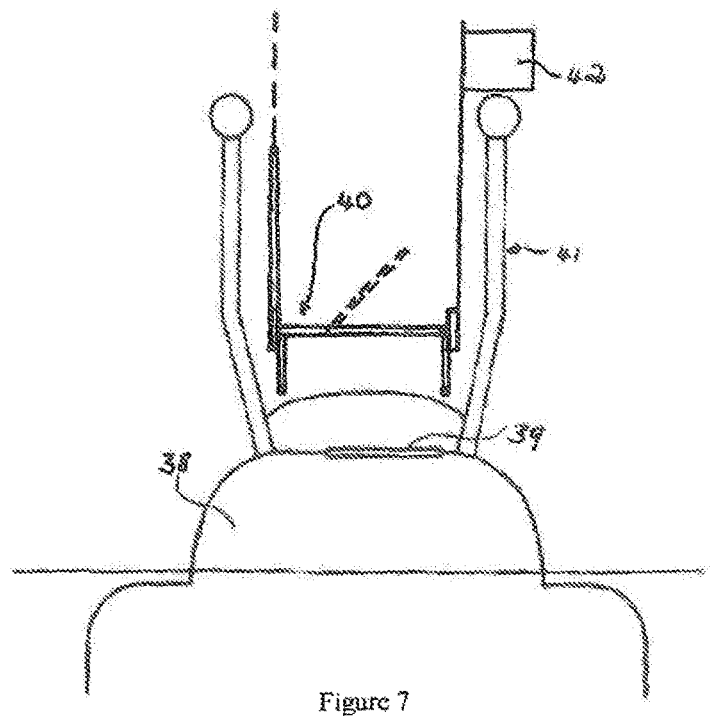
FIG. 7 illustrates an upper part of the vehicle and its associated overhead walkway.

Track 21 is footed in the bottom of aquarium 20 and extends slightly above the bottom of the aquarium such that a vehicle 22 can be coupled to the track in a manner illustrated in FIG. 6.

Track 21 rises to a loading unloading zone 24 (see FIG. 1), and as illustrated in FIG. 3, this is achieved by raising the bottom of the aquarium such that track 21 also rises. At the loading unloading zone 24, vehicle 22 is sufficiently above water to allow easy and quick loading and unloading of passengers. As illustrated in FIG. 1, passengers embark through one side of vehicles 22 and via the queuing platforms 14, and passengers disembark through the other side of vehicle 22 and towards an exit 25. As the aquarium is annular in shape, access to the central hub portion 23 is via a tunnel 26 which can be an acrylic tunnel such that visitors can view the aquarium as they walk through the tunnel.

Central hub 23 has an upper and lower level and FIG. 2 shows the lower level part of central hub 23 which includes a 300 seat restaurant 27, a restaurant service area 28, more toilets 29, a filtration plant, ozone generator and emergency power plant 30, a marine research centre 31 and a dive store 32. Restaurant 27 may have a glass wall 33 to allow patrons to view a portion of the aquarium.

Figure 5:
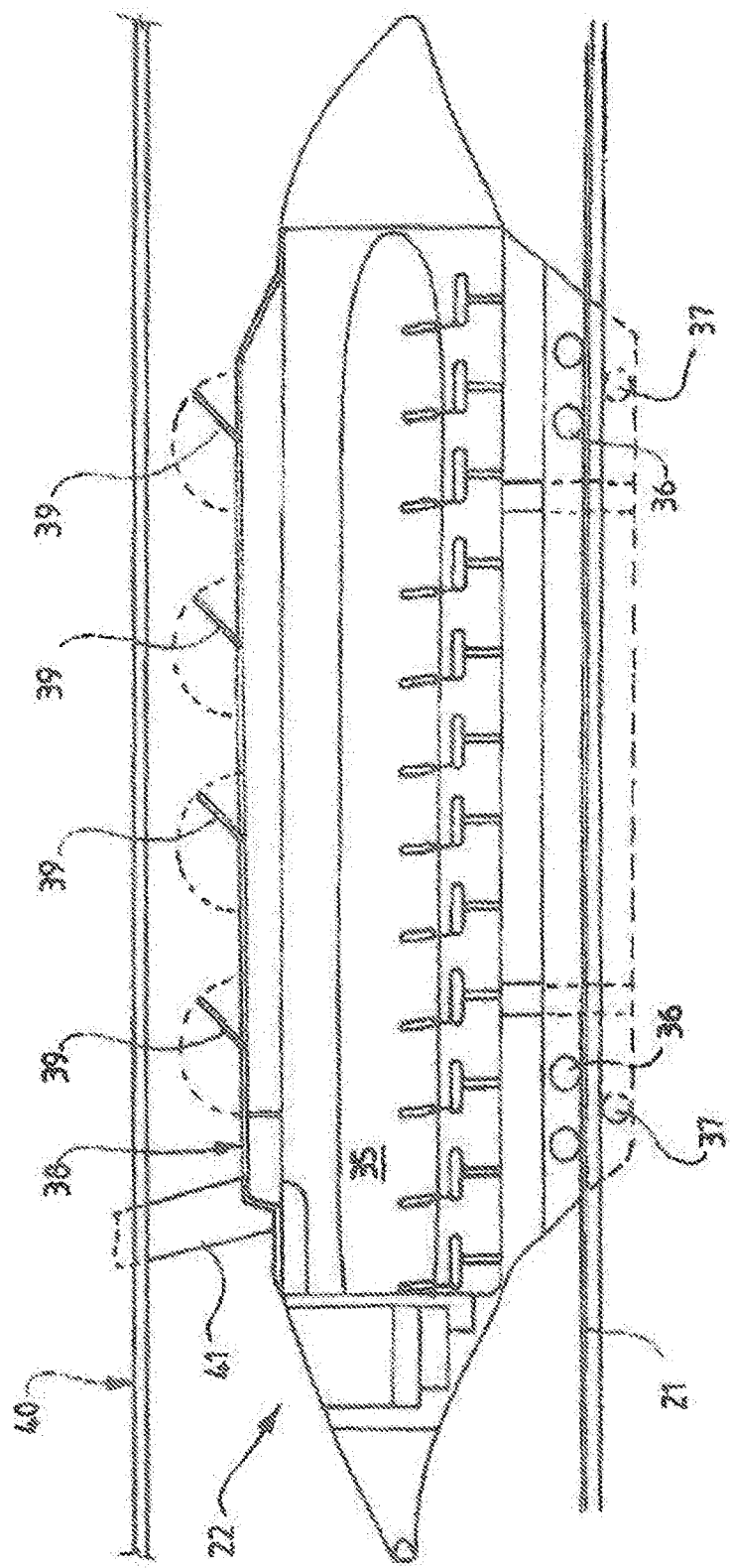
FIG. 5 is a longitudinal section view of the vehicle according to an embodiment of the invention.

FIG. 5 illustrates a typical vehicle. Vehicle 22 has a main body portion 35 designed to accommodate passengers. Vehicle 22 is attached to track 21 through a number of upper rollers 36 and lower rollers 37. This ensures that vehicle 22 is coupled to track 21 and cannot inadvertently be removed from the track. The vehicle is powered along the track by any suitable drive system including cable system, electric motors and the like.

The main body portion of vehicle 35 is designed to be fully submersed with only a top wall 38 being above the level of water in the aquarium. Top wall 38 is provided with a number of escape hatches 39 which are always above water such that should an emergency situation arise, passengers can very quickly disembark through escape hatches 39.

The aquarium is provided with a walkway 40 which is positioned above track 21 and therefore above escape hatches 39. Passengers passing through an escape hatch 39 can simply clamber on to walkway 40 and walk away from vehicle 22. Walkway 40 can also house, in a safe manner, electric supply power 42 to power the vehicle. The vehicle can have one or more extending members or fins 41 which extend up along the side of the walkway 40 and couple with the source of electric power, possibly in a manner similar to an electric rail vehicle.

The system does not require specially skilled operators necessitating extensive training and/or marine licenses. The vehicles can be manned by tour guides having some underwater experience. The vehicles can be controlled from a central location which can monitor speeds, turnarounds and the like.

The vehicles are extremely safe and if any unavoidable incidents such as breakdown arises, the passengers can disembark through the escape hatches at any point in the ride. The vehicle 22 requires no controls on the vehicle itself and hence a standard ballasting system is not required. By not requiring a standard ballasting system, the vehicles can be moved around more quickly as there is no need to careful ballasting to occur.

The vehicles are captivated on the track and submergence and emergence is controlled by the depth of the rail relative to the water surface rather than ballasting or other complicated requirements.

There is no change in ballast to the vehicle whilst submerged and therefore the vehicle is subjected to positive buoyancy at all time. The captivating track keeps the vehicle underwater.

The drive system can vary. One possible drive system is a mechanical system which can consist either of a conveyor-type system or an adoption of a simple wire and winch mechanism. If an electrical power system is required, power is supplied to electric motors on board the vehicles which would drive rollers attached to the rails.

Power can be drawn from a power source on walkway 40.

The vehicle can move over a 240 m track at a rate of 2-3 km per hour making the duration of the voyage about 7 minutes.

The vehicle can have a length of about 13 m, a beam of about 3 m, a height of about 5 m, a weight of about 12 tonnes, and can carry about 50 persons.

It is envisaged that the entire system can entertain up to about 1,200 people per hour in a temperature controlled environment and if four vehicles are used with a ride of about 7-8 minutes, up to 9,000-10,000 persons can be entertained in an 8 hour day.

The system gives passengers the experience of an authentic submarine ride within a safe controlled environment and the turnaround of passengers is large compared to existing systems.

Each vehicle can have full length viewing windows on either side to give passengers an unrestricted view with an arc of 180°. Many variations exist giving seated passengers in the vehicles an excellent arc of visibility of all the aquarium marine life and attractions through full length viewing screens.

Due to the height of the vehicle, it is possible that a passenger could, at some locations on the amusement ride, have an external view that of the waterline 90 which would detract from the reality of the ride because the illusion of depth would be lost for that passenger. In order to avoid this, it is preferred that the arc of visibility from the full length viewing screens be wide when a passenger is looking outwardly (laterally and downwardly), but restricted when a passenger looks out and upward. Preferably, an enlarged "brow" 80 such as that illustrated in FIG. 6 is provided adjacent an external topside of the preferred full length convex viewing screens of the vehicles.

In a preferred form, the brow 80 may be or include an approximately 30 cm outward protrusion on each side of the vehicle above each of the full length convex viewing screens (or a single outward protrusion on each side of the vehicle above the full length convex viewing screens to intentionally restrict or constrain the upward viewing angle of seated passengers, thereby maintaining the illusion of depth for the passengers.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. An underwater mobile observatory system comprising:
   an aquarium able to hold water and large enough to support fish, coral, and to display artificial objects such as shipwrecks and ruins;
   a vehicle track extending through the aquarium, the track generally being adjacent the bottom of the aquarium, the track having a portion which rises to a loading/unloading position;
   at least one passenger vehicle slidingly locked to the track for movement therealong and unable to be lifted from the track such that inclination of the track causes the vehicle to move up and down through water in the aquarium, the passenger vehicle having:
   a main body portion to seat passengers and which is capable of being submerged;
   a top portion which is open to the air;
   a spacing between the track and the water level being controlled such that water does not pass over the top portion;
   an enlarged brow extending outwardly on each side of the at least one passenger vehicle; and
   a walkway provided above and substantially along the track and sufficiently above the waterline to allow the at least one passenger vehicle to pass below the walkway with the walkway being accessible via at least one exit hatch in the top portion of the vehicle.

2. An underwater mobile observatory system as claimed in claim 1 wherein the brow includes an approximately 30 cm outward protrusion on each side of the vehicle.

3. An underwater mobile observatory system as claimed in claim 1 wherein the brow includes an approximately 30 cm outward protrusion extending along each side of the vehicle.

* * * * *